US009661311B2

(12) United States Patent
Jayachandran et al.

(10) Patent No.: US 9,661,311 B2
(45) Date of Patent: May 23, 2017

(54) METHOD AND APPARATUS FOR GENERATING 3D IMAGES USING A PLURALITY OF MOBILE DEVICES

(71) Applicant: SAMSUNG ELECTRONICS CO., LTD., Suwon-si (KR)

(72) Inventors: Prasanth Jayachandran, Tamil Nadu (IN); Muthukumar Subramanian, Tamil Nadu (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 401 days.

(21) Appl. No.: 14/077,521

(22) Filed: Nov. 12, 2013

(65) Prior Publication Data

US 2014/0132737 A1 May 15, 2014

(30) Foreign Application Priority Data

Nov. 12, 2012 (IN) .......................... 4725/CHE/2012
Jul. 22, 2013 (KR) ........................ 10-2013-0086262

(51) Int. Cl.
*H04N 13/02* (2006.01)
*G03B 35/08* (2006.01)

(52) U.S. Cl.
CPC ......... *H04N 13/0282* (2013.01); *G03B 35/08* (2013.01); *H04N 13/0221* (2013.01); *H04N 13/0239* (2013.01); *H04N 13/0296* (2013.01)

(58) Field of Classification Search
CPC ............... G03B 35/08; H04N 13/0221; H04N 13/0239; H04N 13/0282; H04N 13/0296
USPC .............................................. 348/42, 47, 50
See application file for complete search history.

(56) References Cited

U.S. PATENT DOCUMENTS

| 7,518,641 | B2* | 4/2009 | Mashitani | ............ | H04N 7/142 348/218.1 |
| 8,259,161 | B1 | 9/2012 | Huang et al. | | |
| 2008/0064437 | A1 | 3/2008 | Chambers et al. | | |
| 2010/0225744 | A1 | 9/2010 | Tomizawa et al. | | |

(Continued)

FOREIGN PATENT DOCUMENTS

JP 2010-157850 A 7/2010
WO 2012/115253 A1 8/2012

OTHER PUBLICATIONS

Benet, G, "Using Infrared Sensors for Distance Measurement in Mobile Robots," Robotics and Autonomous Systems 40, (2002), 255-266, Received Aug. 9, 2001; received in revised form Mar. 27, 2002.

(Continued)

Primary Examiner — Francis G Geroleo
(74) Attorney, Agent, or Firm — Sughrue Mion, PLLC

(57) ABSTRACT

A technique for generating a three-dimensional (3D) image using a plurality of terminals is provided. The technique includes performing calibration of a distance between lenses in a plurality of terminals by using view images of a two-dimensional (2D) object acquired by the plurality of terminals, acquiring view images of a 3D object while maintaining a lens distance between the plurality of terminals which is determined based on the result of the calibration, and processing the acquired view images of the 3D object in order to generate a 3D image of the 3D object. The 3D image allows a user to experience the same sense of depth as viewing the object in the real world.

8 Claims, 15 Drawing Sheets

(56) References Cited

U.S. PATENT DOCUMENTS

| | | | |
|---|---|---|---|
| 2010/0306335 A1* | 12/2010 | Rios | G06T 17/00 709/211 |
| 2011/0109726 A1* | 5/2011 | Hwang | H04N 13/0242 348/47 |
| 2012/0113230 A1* | 5/2012 | Jin | H04N 13/0296 348/47 |
| 2012/0169846 A1 | 7/2012 | Li et al. | |
| 2012/0249806 A1* | 10/2012 | Gong | H04N 5/247 348/207.1 |
| 2012/0293630 A1* | 11/2012 | Persaud | A63F 13/06 348/47 |
| 2013/0278728 A1* | 10/2013 | Gong | H04N 5/247 348/47 |
| 2013/0329014 A1 | 12/2013 | Obata | |
| 2014/0293013 A1* | 10/2014 | Gong | H04N 5/247 348/47 |

OTHER PUBLICATIONS

Communication from the European Patent Office issued Feb. 10, 2014 in a counterpart European Application No. 13192234.6.
Communication dated Oct. 4, 2016, issued by the European Patent Office in counterpart European Patent Application No. 13192234.6.

* cited by examiner

METHOD AND APPARATUS FOR
GENERATING 3D IMAGES USING A
PLURALITY OF MOBILE DEVICES

RELATED APPLICATIONS

This application claims the benefit of India Application No. 4725/CHE/2012, filed on Nov. 12, 2012, in the India Patent Office and Korean Patent Application No. 10-2013-0086262, filed on Jul. 22, 2013, in the Korean Intellectual Property Office, the disclosures of which are incorporated herein by reference, in their entireties.

BACKGROUND

1. Field

One or more exemplary embodiments relate to a technique for generating stereoscopic images by using a plurality of mobile devices.

2. Description of the Related Art

Three dimensional (3D) images provide a depth perception to a user. A technique of generating 3D images by rendering two-dimensional (2D) images is gaining popularity. 3D images are also referred to as stereoscopic images.

A user may generate 3D images by using various types of computing devices. Recent advancements in compact devices, such as mobile devices, enables a user to generate 3D images by using mobile devices.

However, according to techniques of the related art, 3D images are generated by using a single mobile device including first and second cameras. The first and second cameras are horizontally aligned so as to obtain similar photographic ranges. The first and second cameras are separated from each other by an interocular distance and take pictures of a 3D object. To produce a stereoscopic image, pieces of information which respectively indicate a right-eye image and a left-eye image are added to images of the object taken by the first and second cameras. A 3D image processing algorithm is performed based on the images photographed by the first and second cameras in order to generate a 3D image. The generated 3D image allows a user to experience the same sense of depth as would be obtained when viewing an object in the real world.

The techniques of the related art use an easy-to-carry mobile device in order to generate a 3D image and allows a user to perceive the same sense of depth as when observing a real object. However, most mobile devices include only a single camera. Thus, to produce a 3D image, the user requires use of a mobile device including two cameras, which is more expensive than existing mobile devices.

Thus, a need exists for a method and apparatus for more efficiently generating 3D images at low cost by using a mobile device.

SUMMARY

One or more exemplary embodiments include a method and apparatus for efficiently generating three-dimensional (3D) images by using a plurality of mobile devices.

Additional aspects will be set forth in part in the description which follows and, in part, will be apparent from the description, or may be learned by practice of the exemplary embodiments.

According to one or more exemplary embodiments, a method of generating a 3D image in a first terminal in cooperation with a second terminal includes:

Extrapolating, from a view image of a two-dimensional (2D) object acquired by the first terminal, a view image of the 2D object at a location that is an interocular distance away from the first terminal; performing calibration of a distance between lenses in the first and second terminals by using the extrapolated view image; and generating a 3D image of a 3D object by using a view image of the 3D object acquired by the first terminal and a view image of the 3D object acquired by the second terminal, when the first and second terminals are separated from each other by a distance between the lenses as determined by the calibration.

The performing of the calibration may include transmitting the extrapolated view image to the second terminal and receiving from the second terminal a message which indicates that the distance between the lenses in the first and second terminals is an optimal distance for 3D imaging, based on the transmitted message.

The extrapolating of the view image of the 2D object may be performed based on at least one of a distance between the first terminal and the 2D object, a binocular parallax angle, and information related to the performance of the second terminal.

The method may further include informing a user that the distance between lenses in the first and second terminals is an optimal distance for 3D imaging based on the received message.

The generating of the 3D image may include receiving from the second terminal the view image of the 3D object acquired by the second terminal.

According to one or more exemplary embodiments, a method of generating a three-dimensional (3D) image in a second terminal in cooperation with a first terminal includes: receiving from the first terminal an image extrapolated as a view image of a two-dimensional (2D) object at a location that is an interocular distance away from the first terminal; performing calibration of a distance between lenses in the first and second terminals based on the degree of similarity between the received image and a view image of the 2D object acquired by the second terminal; and transmitting to the first terminal a message indicating that the distance between the lenses is an optimal distance for 3D imaging, based on the result of the calibration.

The method may further include informing a user that the lens distance from the first terminal is an optimal distance for 3D imaging, based on the result of the calibration.

The method may further include transmitting a view image of a 3D object taken when the second terminal is separated from the first terminal by the lens distance as determined by the calibration.

According to one or more exemplary embodiments, a first terminal for generating a three-dimensional (3D) image in cooperation with a second terminal includes: an extrapolator configured to extrapolate from a view image of a two-dimensional (2D) object acquired by the first terminal a view image of the 2D object at a location that is an interocular distance away from the first terminal; a calibrator configured to perform calibration of a distance between the lenses in the first and second terminals by using the extrapolated view image; and a 3D image generator configured to generate a 3D image of a 3D object by using a view image of the 3D object acquired by the first terminal and a view image of the 3D object acquired by the second terminal when the first and second terminals are separated from each other by a distance between the lenses as determined by the calibration.

The calibrator may include a transmitter configured to transmit to the second terminal the extrapolated view image and may include a receiver configured to receive from the second terminal a message which indicates that the distance between lenses in the first and second terminals is an optimal distance for 3D imaging, based on the transmitted image.

The extrapolator may be configured to extrapolate a view image of the 2D object based on at least one of a distance between the first terminal and the 2D object, a binocular parallax angle, and information related to the performance of the second terminal.

The first terminal may further include a user notifier configured to notify a user that the distance between lenses in the first and second terminals is an optimal distance for 3D imaging, based on the received message.

The first terminal may further include a receiver configured to receive from the second terminal the view image of the 3D object acquired by the second terminal.

According to one or more exemplary embodiments, a second terminal for generating a three-dimensional (3D) image in cooperation with a first terminal includes: a receiver configured to receive from the first terminal an image extrapolated as a view image of a two-dimensional (2D) object at a location that is an interocular distance away from the first terminal; a calibrator configured to perform calibration of a distance between lenses in the first and second terminals based on the degree of similarity between the received image and a view image of the 2D object acquired by the second terminal; and a transmitter configured to transmit to the first terminal a message which indicates that the lens distance from the first terminal is an optimal distance for 3D imaging, based on the result of the calibration.

The second terminal may further include a user notifier configured to inform a user that the lens distance from the first terminal is an optimal distance for 3D imaging, based on the result of the calibration.

The transmitter may be configured to transmit a view image of a 3D object acquired when the second terminal is separated from the first terminal by the lens distance as determined by the calibration.

An aspect of an exemplary embodiment may further provide an apparatus for generating a 3D image using first and second terminals, the apparatus including: a first terminal configured to acquire a view image of a 3D object when lenses in the first and second terminals are separated from each other by an optimal distance for 3D imaging; a second terminal configured to acquire a view image of the 3D object when lenses in the first and second terminals are separated from each other by an optimal distance for 3D imaging, and configured to transmit the acquired view image of the 3D object to the first terminal; and a 3D image generator configured to generate a 3D image of the 3D object.

The generated 3D image may be stored in the second terminal. The apparatus may further include a calibrator configured to perform calibration of a distance between the lenses in the first and second terminals.

The first terminal may include an extrapolator configured to extrapolate a view image of a 2D object at a location that is an interocular distance away from the first terminal.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

As used herein, a "view image" refers to an image of an object formed by a lens. The view image may be the same as an image that a user sees through a viewfinder. The view-finder is an optical device within a camera for observing an object so as to facilitate composition of a screen during photography. The exemplary embodiments are not limited thereto, and an image observed by the user through the viewfinder may be different from a view image due to a mismatch between what a lens sees and what the viewfinder sees.

Exemplary embodiments will now be described more fully hereinafter with reference to the accompanying drawings so that they may be easily implemented by one of ordinary skill in the art. The exemplary embodiments may, however, be embodied in many different forms and should not be construed as being limited to the exemplary embodiments set forth herein. Parts not related to the exemplary embodiments are omitted for purposes of avoiding obscuring the invention. Like numerals denote like elements throughout. Expressions such as "at least one of," when preceding a list of elements, modify the entire list of elements and do not modify the individual elements of the list.

Figure 1:
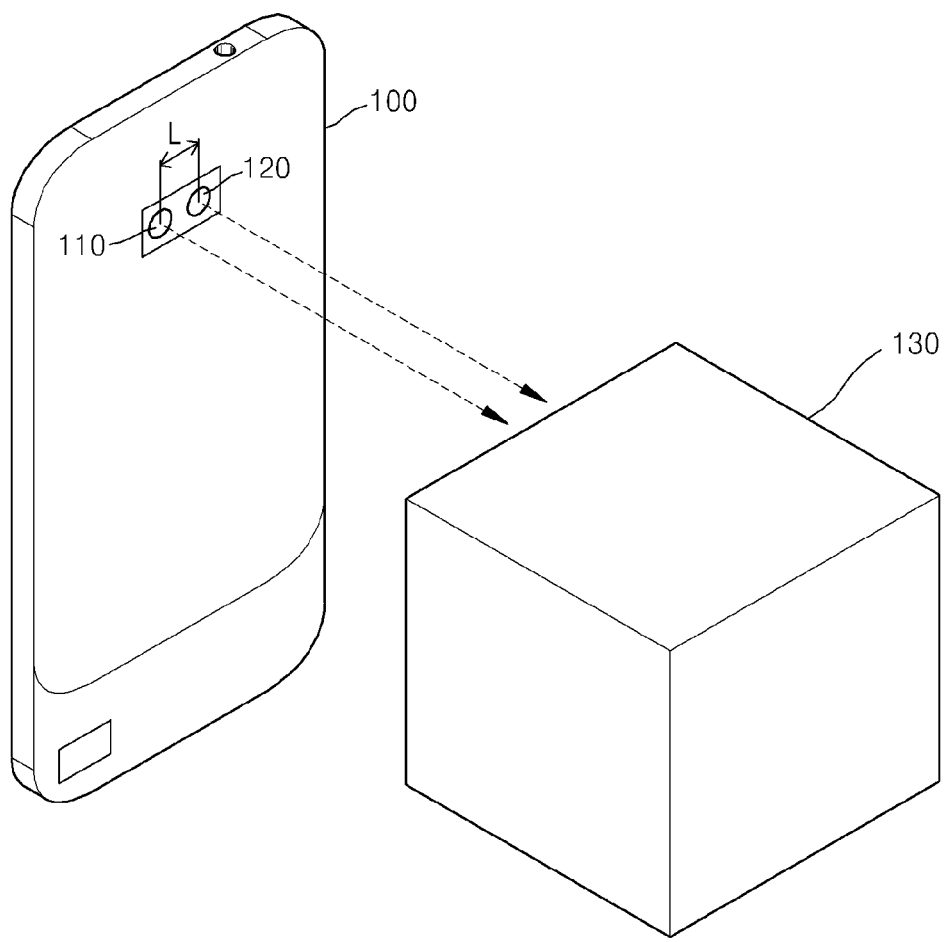
FIG. 1 is a conceptual diagram for explaining generation of a three-dimensional (3D) image by using a mobile device including a first camera and a second camera.

FIG. 1 is a conceptual diagram which explains the generation of a three-dimensional (3D) image by using a mobile device which includes a first camera 110 and a second camera 120.

FIG. 1 shows a terminal 100 including a first camera 110 and a second camera 120, and a three-dimensional (3D) object 130. The terminal 100 includes the first camera 110 and a second camera 120.

The first camera 110 and the second camera 120 are horizontally aligned to obtain similar photographing ranges and are separated from each other by an interocular distance L in order to generate a 3D image.

The terminal 100 uses the first camera 110 and the second camera 120 to take pictures of the 3D object 130. To produce a stereoscopic image, pieces of information which indicates a right-eye image and a left-eye image are added to images of the 3D object 130 respectively taken by the first and second cameras 110 and 120. A 3D image processing algorithm is performed based on the images photographed by the first and second cameras 110 and 120 in order to generate a 3D image. The generated 3D image allows a user to experience the same sense of depth as in viewing an object in the real world. The generated 3D image may provide a user with the same sense of depth as in viewing an object in the real world.

Figure 2:
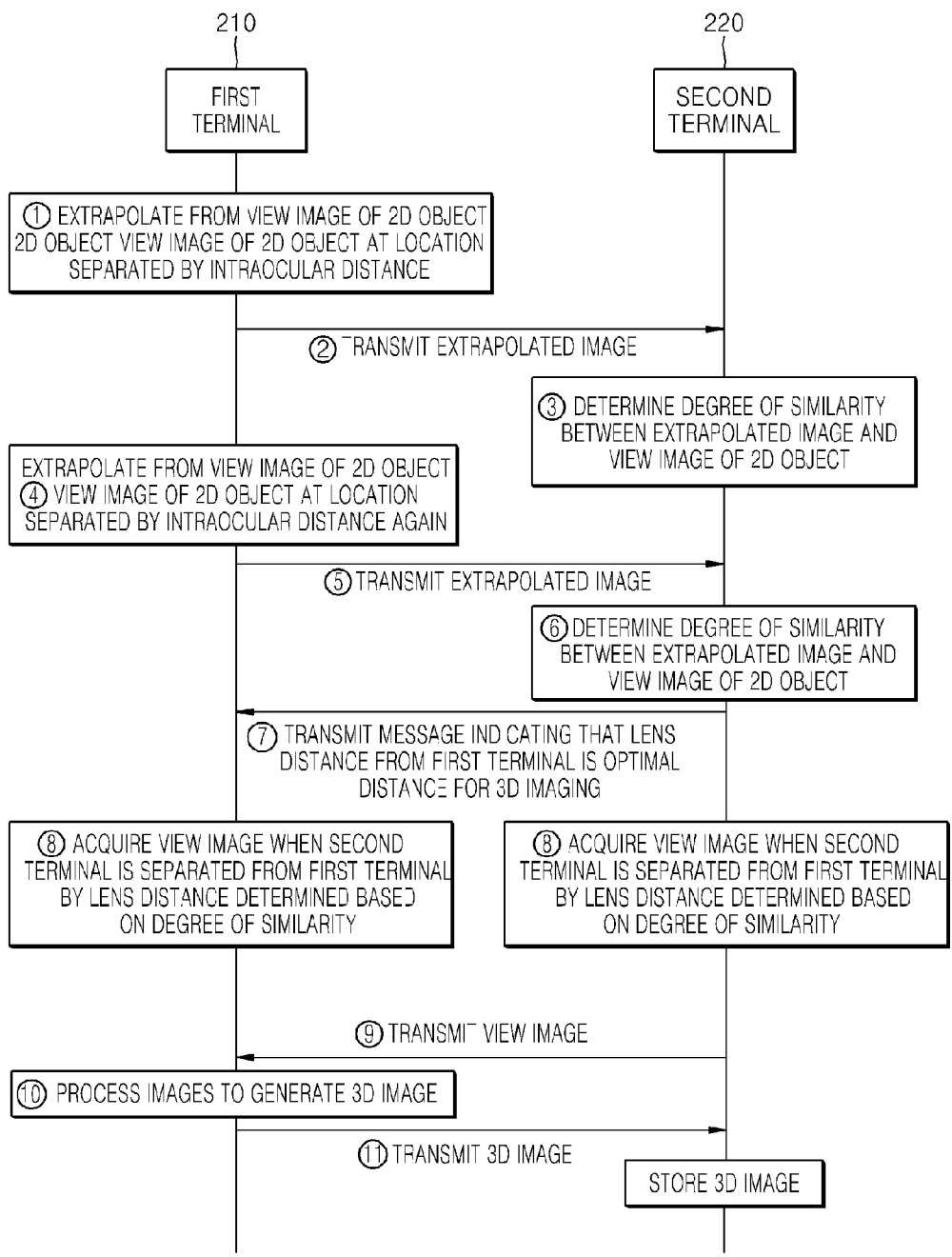
FIG. 2 is a sequence diagram which illustrates a method of generating 3D images by using two mobile devices, according to an exemplary embodiment.

FIG. 2 is a sequence diagram illustrating a method of generating 3D images by using two mobile devices according to an exemplary embodiment.

Referring to FIG. 2, the method is performed by the first terminal 210 and the second terminal 220.

Before operation 1, the first terminal 210 acquires a view image of an arbitrary two-dimensional (2D) object. The acquired view image is required to perform calibration on a distance between the lenses of the first and second cameras 110 and 120.

The first terminal 210 extrapolates from the view image of the arbitrary 2D object a view image of the 2D object at a location, which is separated from the first terminal 210 itself by an interocular distance (operation 1).

The first terminal 210 transmits the extrapolated view image to the second terminal 220 (operation 2).

In operation 3, the second terminal 220 receives the extrapolated view image from the first terminal 210 and acquires a view image of the 2D object. The second terminal 220 then determines the degree of similarity between the received image and the acquired view image of the 2D object. In an exemplary embodiment, an assumption is made that the degree of similarity there between is less than or equal to a predetermined value. In this case, the second terminal 220 may determine that the distance between the lenses in the first and second terminals 210 and 220 is not an optimal distance for 3D imaging.

The first terminal 210 acquires from the acquired view image of the 2D object a view image of the 2D object and again extrapolates a view image of a 2D object at a location, which is separated from the first terminal 210 itself by the interocular distance, (operation 4).

The first terminal 210 repeats the operation 2 to transmit the extrapolated view image to the second terminal 220 (operation 5).

The second terminal 220 receives the extrapolated view image from the first terminal 210, acquires a view image of the 2D object, and again determines the degree of similarity between the received image and the view image of the 2D object (operation 6). In an exemplary embodiment, it is assumed that the degree of similarity there between is greater than or equal to the predetermined value. In this case, the second terminal 220 may determine that the distance between the lenses of the first and second terminals 210 and 220 is an optimal distance for 3D imaging.

The second terminal 220 transmits to the first terminal 210 a message which indicates that the distance between lenses in the first and second terminals 210 and 220 is an optimal distance for 3D imaging (operation 7).

The first terminal 210 receives the message from the second terminal 220 and acquires a view image of a 3D object based on the received message when the lenses in the first and second terminals 210 and 220 are separated from each other by the optimal distance for 3D imaging (operation 8). The second terminal 220 also acquires a view image of the 3D object based on the result of the determination when the lenses in the first and second terminals 210 and 220 are separated from each other by the optimal distance for 3D imaging (operation 8).

The second terminal 220 then transmits the acquired view image of the 3D object to the first terminal 210 (operation 9).

The first terminal 210 generates a 3D image by using the view image of the 3D object acquired by the first terminal 210 itself and view image of the 3D object acquired by the second terminal 220 (operation 10). A 3D image processing algorithm may be performed to generate the 3D image. The generated 3D image may be stored in the first terminal 210.

The first terminal 210 transmits the generated 3D image to the second terminal 220 so that the 3D image may be stored in the second terminal 220 (operation 11).

The operations 4 and 5 may be repeated until the first terminal 210 receives from the second terminal 220 a message which indicates that the distance between the lenses of the first and second terminals 210 and 220 is an optimal distance. However, the exemplary embodiments are not limited thereto, and the operations 4 and 5 may not be repeated. In this case, the second terminal 220 may determine the degree of similarity between the extrapolated view image received in the operation 3 and the view image of the 2D object.

Figure 3:
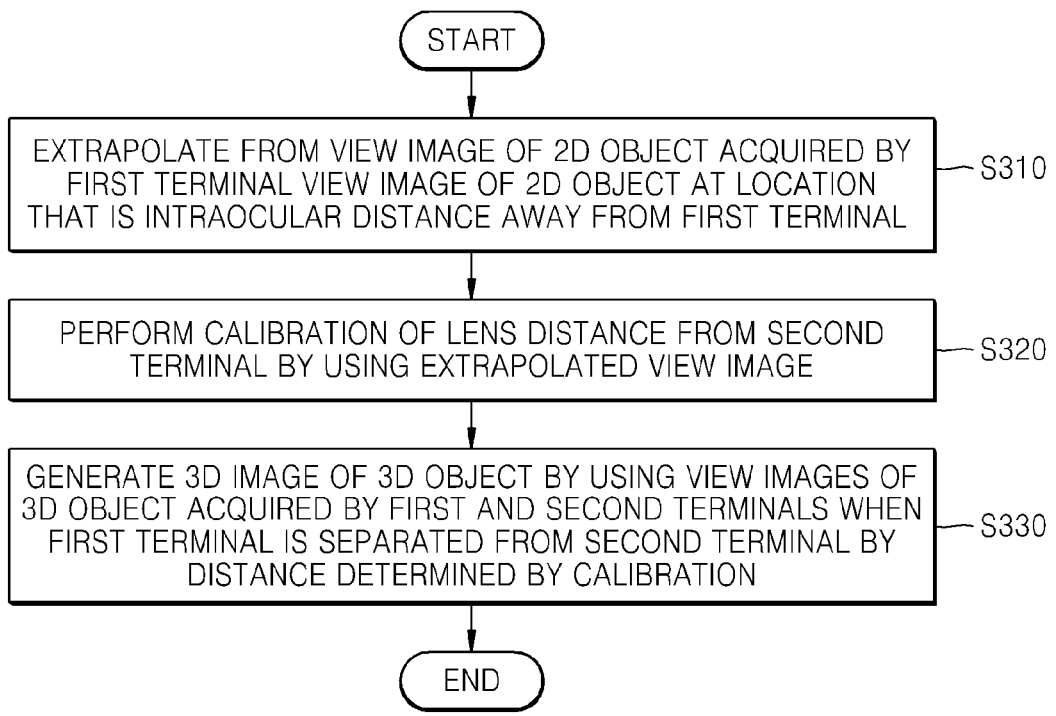
FIG. 3 is a flowchart of a method of generating 3D images in a first terminal in cooperation with a second terminal according to an exemplary embodiment.

FIG. 3 is a flowchart of a method of generating 3D images in a first terminal in cooperation with a second terminal, according to an exemplary embodiment.

Prior to operation S310, the first terminal acquires a view image of a 2D object.

The first terminal extrapolates a view image of the 2D object at a location that is an interocular distance away from the first terminal from the acquired view image of the 2D object (S310). The extrapolation may be performed based on at least one of a distance between the first terminal and the 2D object, a binocular parallax angle and information related to the performance of the second terminal.

Calibration is performed based on a distance between the lenses in the first and second terminals by using the extrapolated view image (S320). Performing the calibration includes transmitting the extrapolated view image to the second terminal, determining that the distance between lenses in the first and second terminals is an optimal distance for 3D imaging based on the message received from the second terminal 220, and receiving from the second terminal a message indicating the result of the determination. The received message may inform a user that the distance between the lenses in the first and second terminals is an optimal distance for 3D imaging.

The first terminal generates a 3D image of a 3D object by using a view image of the 3D object acquired by the first terminal and a view image of the 3D object acquired by the second terminal when the lenses in the first and second terminals are separated from each other by the distance determined based on the result of the calibration (S330). That is, the first terminal may receive a view image of a 3D object from the second terminal in order to generate a 3D image of the 3D object.

Figure 4:
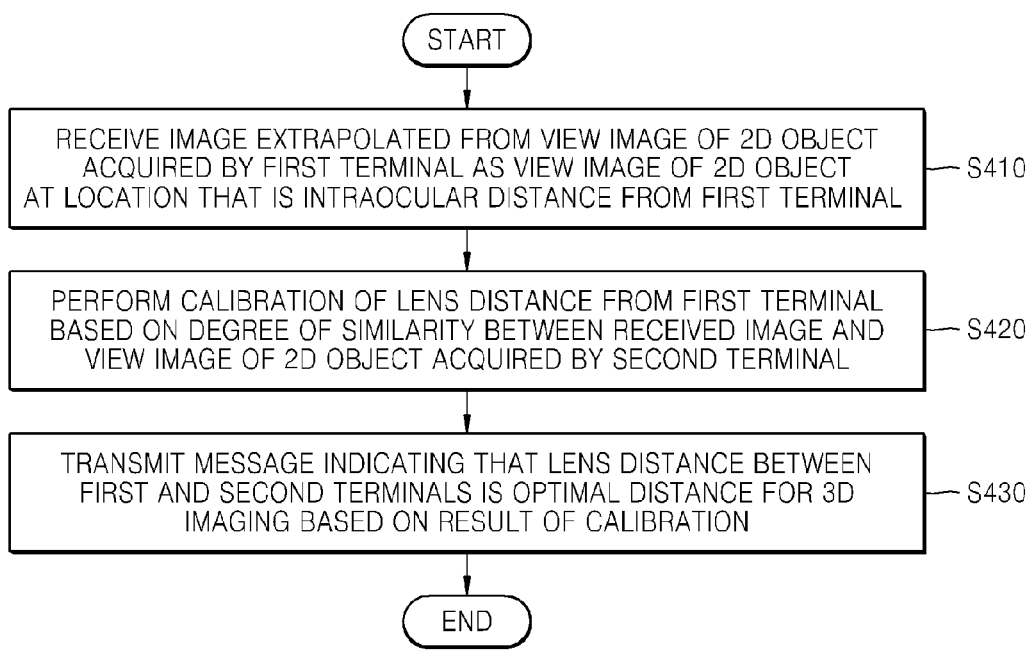
FIG. 4 is a flowchart of a method of generating 3D images in a second terminal in cooperation with a first terminal according to an exemplary embodiment.

FIG. 4 is a flowchart of a method of generating 3D images in a second terminal in cooperation with a first terminal, according to an exemplary embodiment.

The second terminal receives from the first terminal an image extrapolated as a view image of a 2D object at a position that is separated from the first terminal by an interocular distance (S410).

The second terminal acquires a view image of the 2D object (S420). Calibration is then performed on the first terminal based on the degree of similarity between the image received from the first terminal and the acquired view image of the 2D object. In response to the degree of similarity being greater than or equal to a predetermined value, the second terminal may determine that a distance between the lenses in the first and second terminals 210 and 220 is an optimal distance for 3D imaging. On the other hand, in response to the degree of similarity being less than the predetermined value, the second terminal may determine that the distance between the lenses is not an optimal distance for 3D imaging.

The second terminal transmits a message which indicates that the distance between the lenses is an optimal distance for 3D imaging, based on the result of the calibration (S430).

The second terminal may determine that the lens distance between the first and second terminals is an optimal distance for 3D imaging, based on the result of calibration, and informs a user of the result of the determination. The second terminal may transmit to the first terminal a view image of a 3D object acquired when the second terminal is separated from the first terminal by the lens distance determined by the calibration.

FIGS. 5A through 5I illustrate an example of generating a stereoscopic image by using two mobile devices according to an exemplary embodiment.

Figure 5A:
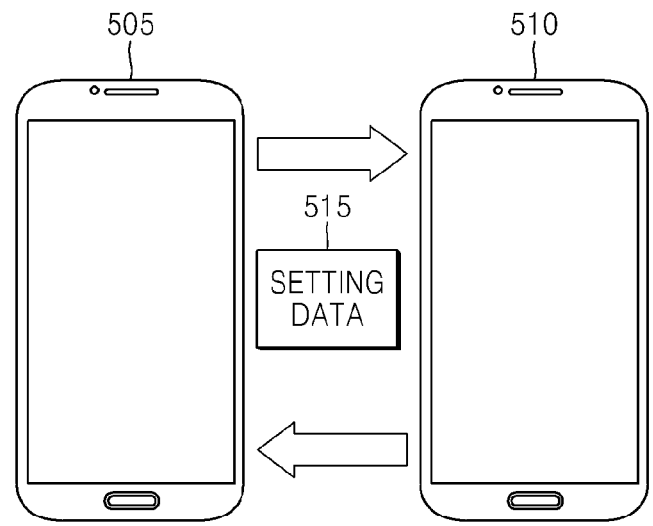
FIGS. 5A through 5I illustrate an example of generating a stereoscopic image by using two mobile devices according to an exemplary embodiment.

FIG. 5A shows mobile devices 505 and 510. A process is performed to determine which of the mobile devices 505 and 510 serves as a first or second terminal. That is, before performing calibration, the process is performed to make a determination as to which of the mobile devices 505 and 510 is the first and second terminals. Setting data 515 is exchanged between the mobile devices 505 and 510 before making a determination as to which of the mobile devices 505 and 510 is the first or second terminal.

The setting data 515 may include information related to the mobile devices 505 and 510, such as camera resolution, information related to a distance measuring sensor, processor information, resource usage information, and network connection information. In the exemplary embodiment, an assumption is made that the mobile device 505 offers higher camera resolution, higher image processing performance, and better network connection quality than the mobile device 510.

Immediately upon exchanging the setting data 515 between the mobile devices 505 and 510, the mobile device 505 may be determined as the first terminal because of its better performance than the mobile device 510, while the mobile device 510 may be determined to be the second terminal.

The mobile device 505 determined to be the first terminal acquires a view image 520 from an embedded camera 525, followed by calibration. The view image 520 is displayed on a display of the first terminal as shown in FIG. 5B.

Figure 5B:
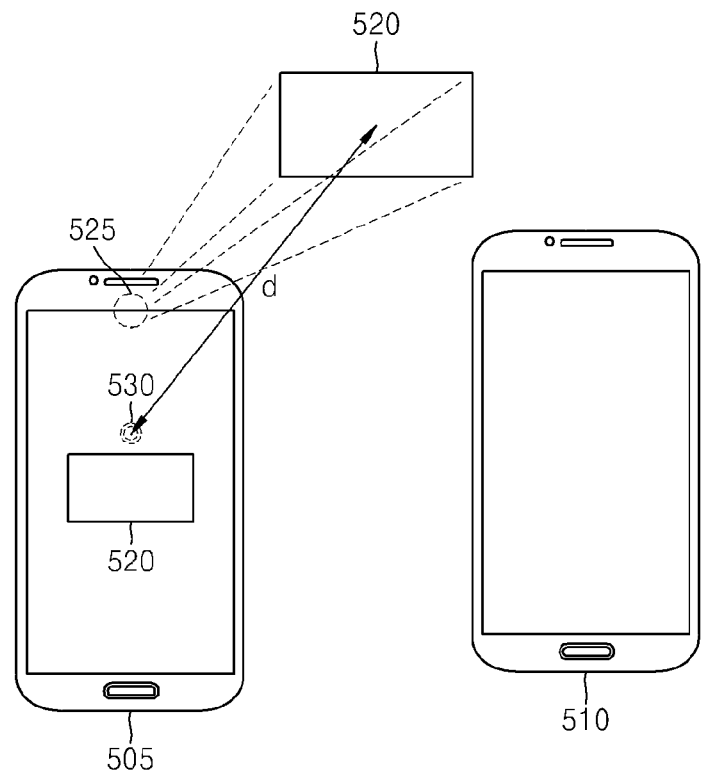

Referring to FIG. 5B, the view image 520 is an image of a 2D object that is a distance 'd' away from the mobile device 505.

The mobile device 505 may include a distance measuring sensor 530 that is used to determine the distance 'd' away from the mobile device 505 to be calibrated. The distance measuring sensor 530 may be a light or sound based sensor.

Figure 5C:
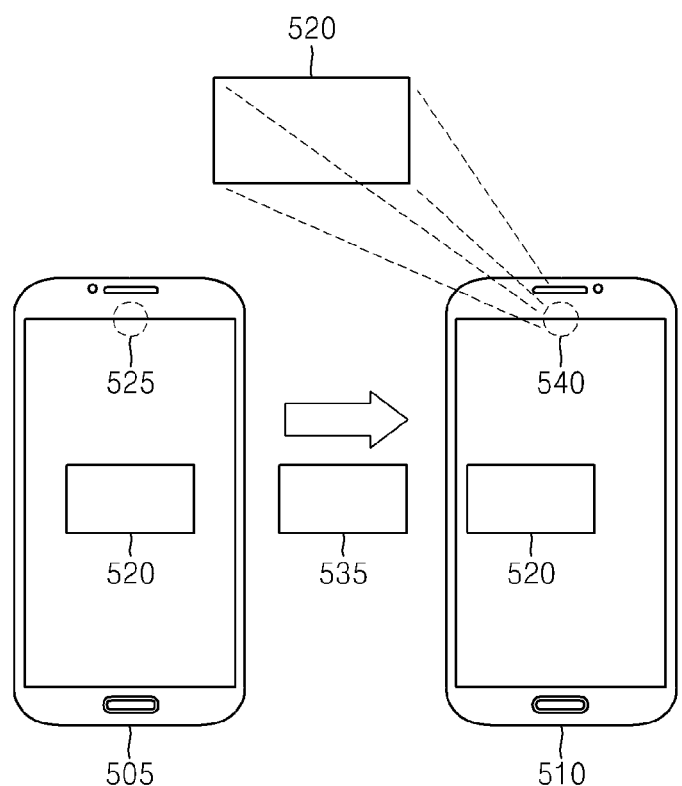

Referring to FIG. 5C, the mobile device 510 determined to be the second terminal acquires a view image 520 from its embedded camera 540. The view image 520 acquired by the mobile device 510 is displayed on a display of the mobile device 510 as shown in FIG. 5C.

The mobile device 505 extrapolates a view image of the 2D object at a location that is an interocular distance away from the mobile device 505 from the view image of the 2D object acquired by the mobile device 505, and generates an extrapolated image 535. In the exemplary embodiment, an assumption is made that the mobile devices 505 and 510 respectively capture images viewed by left and right eyes. The mobile device 505 may extrapolate a view image of the 2D object at a position that is separated rightward from the mobile device 505 by the interocular distance. The extrapolation may be performed based on a binocular parallax angle, the distance 'd' between the mobile device 505 and the 2D object, which is measured by the distance measuring sensor 530, and information related to the performance of the mobile device 510.

Referring to FIG. 5C, the extrapolated image 535 is transmitted from the mobile device 505 to the mobile device 510.

Figure 5D:
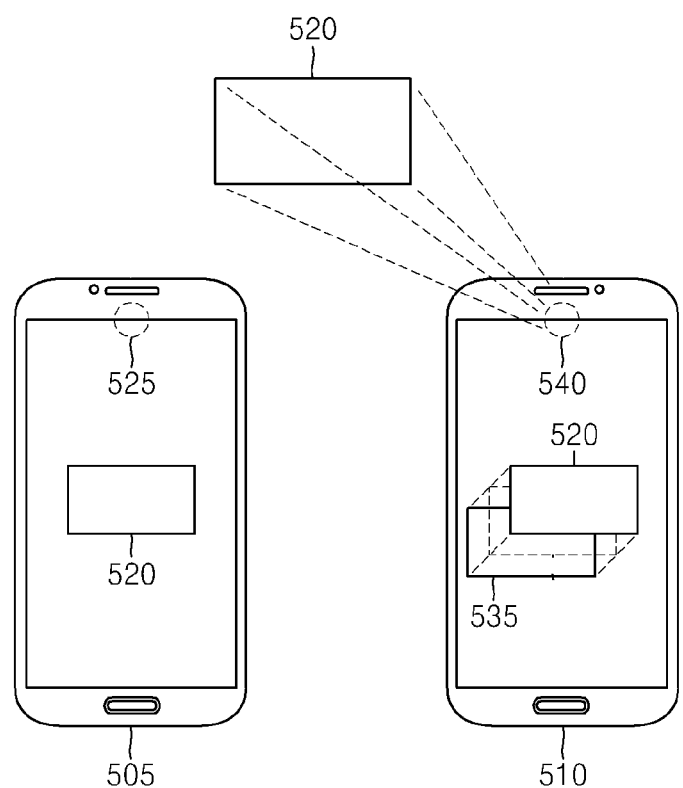

Referring to FIG. 5D, the mobile device 510 determines the degree of similarity between the captured view image 520 and the extrapolated image 535, e.g., by superimposing the captured view image 520 on the extrapolated image 535. As the view image 520 is more accurately superimposed onto extrapolated image 535, the degree of similarity there between may increase.

Referring to FIG. 5D, as the mobile device 510 moves according to a user's movement, the view image 520 captured by the mobile device 510 may be changed. In an exemplary embodiment, an assumption is made that the view image 520 acquired by the mobile device 510 is superimposed accurately onto the extrapolated image 535. However, the exemplary embodiments are not limited thereto, and the degree of similarity between the extrapolated image 535 and the view image 520 may be greater than a predetermined value. Thus, it is possible to obtain a lens distance (L) 570 between the mobile devices 505 and 510, which is similar to the interocular distance for perceiving a stereoscopic image.

Figure 5E:
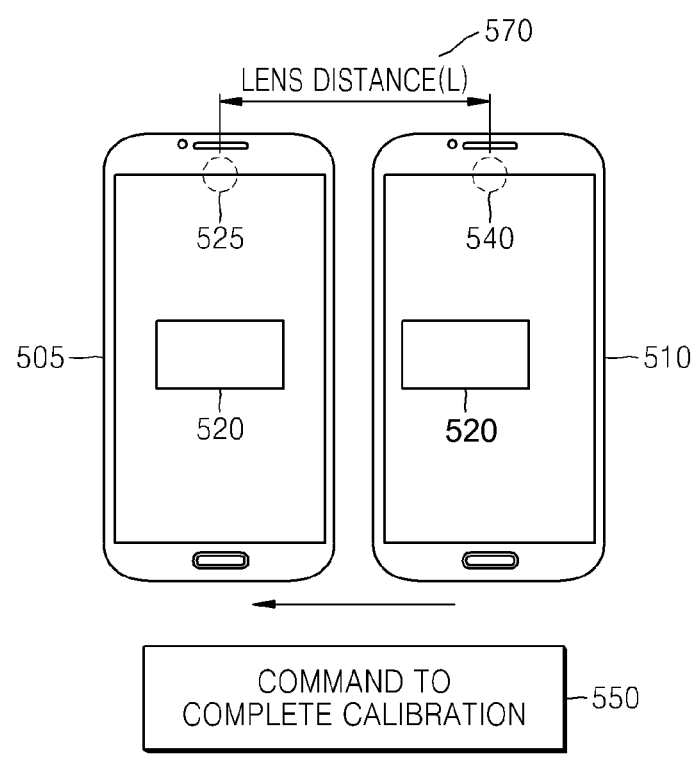

Referring to FIG. 5E, immediately after obtaining the lens distance (L) 570, the mobile device 510 sends a command 550 to the mobile device 505, which indicates completion of the calibration. In this case, the command may contain a message indicating that the lens distance L between the mobile devices 505 and 510 is an optimal distance for 3D imaging.

Figure 5F:
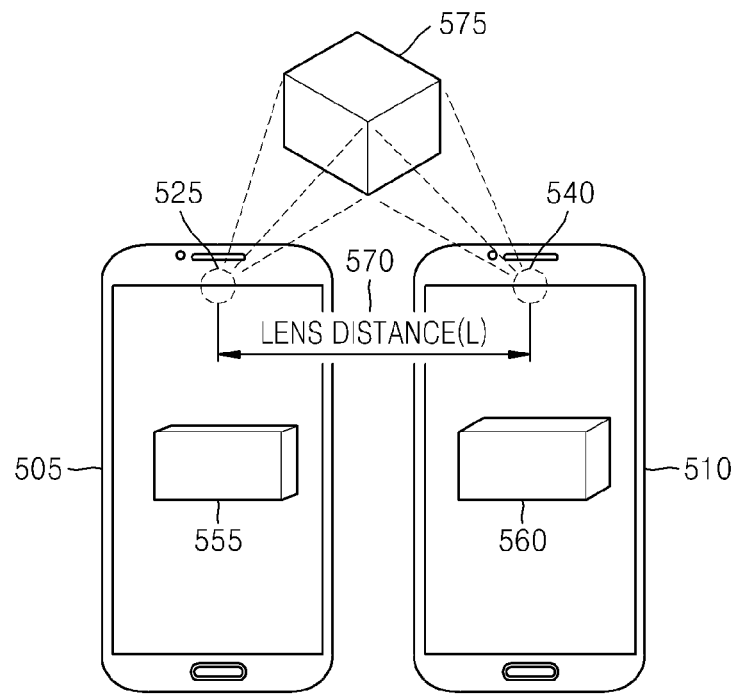

Referring to FIG. 5F, the mobile device 510 may acquire a view image 575 while mainlining the lens distance (L) 570 with the mobile device 505. According to an exemplary embodiment, the mobile device 510 may acquire the view image 575 by taking a photograph of a 3D object. The view image 575 may include the shape of a portion of the 3D object. Referring to FIG. 5F, the mobile device 505 acquires a front view image 555 from a front surface of the 3D object, and the mobile device 510 acquires a side view image 560 from a side surface thereof.

Figure 5G:
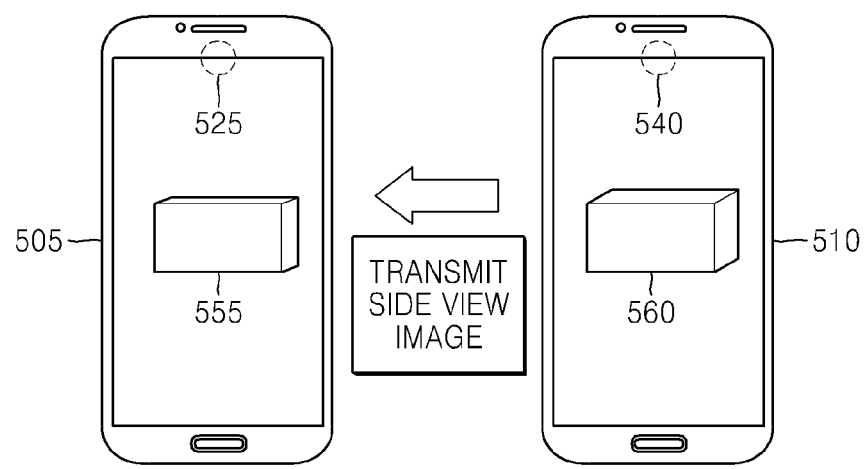

Referring to FIG. 5G, a side view image 560 may be transmitted to the mobile device 505. In one exemplary embodiment, the side view image 560 may be transmitted to the mobile device 505 by using a wireless network protocol. Similarly, different transport protocols may be used for transmission.

Figure 5H:
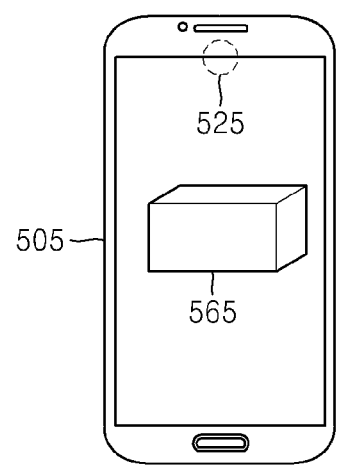

Referring to FIG. 5H, the front view image 555 and the side view image 560 may be processed so that the mobile device 505 may produce a stereoscopic image 565. To generate the stereoscopic image 565, a 3D image processing algorithm may be used to process the front view image 555 and the side view image 560.

Figure 5I:
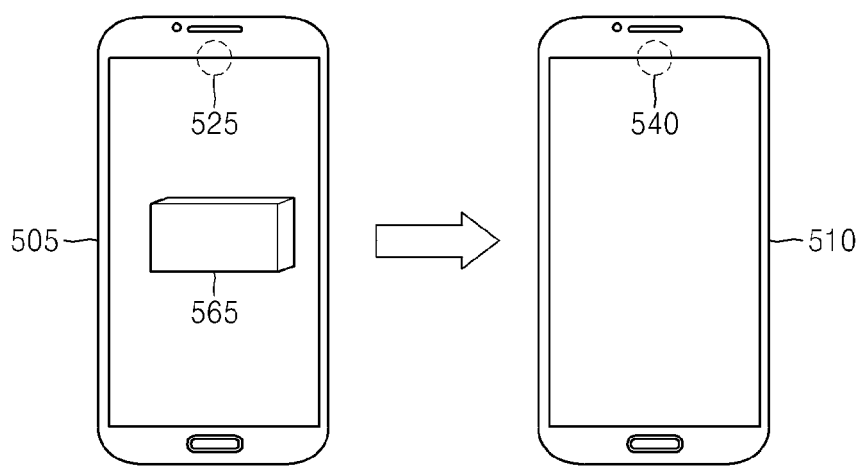

Referring to FIG. 5I, the stereoscopic image 565 may be transmitted to the mobile device 510 so that a user can see it. For example, a wireless network protocol may be used to transmit the stereoscopic image 565.

Figure 6A:
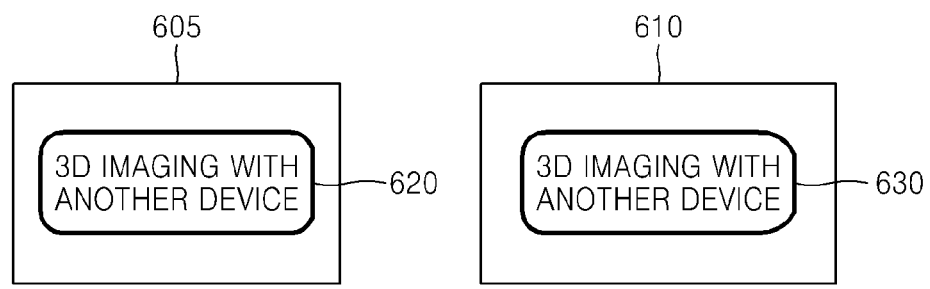
FIG. 6 illustrates a detailed process of determining first and second terminals by exchanging setting data between two mobile devices according to an exemplary embodiment.
Figure 6B:
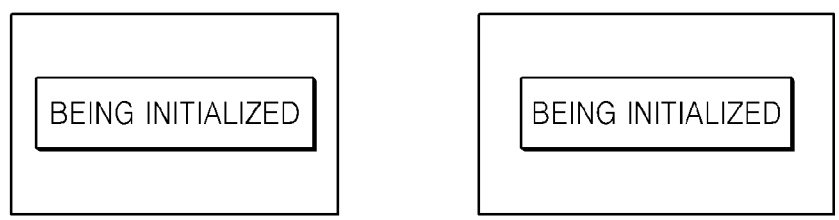
Figure 6C:
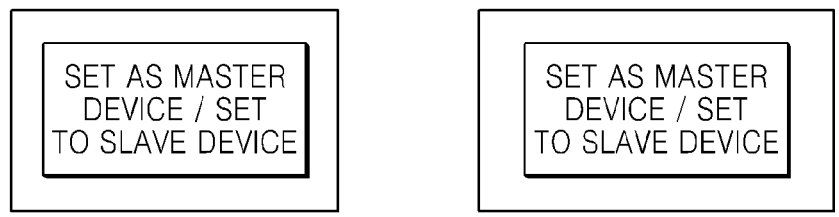

FIGS. 6A through 6C illustrate a detailed process of determining first and second terminals by exchanging setting data (515 in FIG. 5A) between the two mobile devices (505 and 510 in FIG. 5A) according to an exemplary embodiment.

As shown in FIG. 6A, the mobile devices 505 and 510 include displays 605 and 610, respectively. The displays 605 and 610 have first and second buttons 620 and 630 thereon, respectively. In one exemplary embodiment, when a user clicks the first button 620 on the mobile device 505, the mobile device 505 may wait for the participation of another terminal. Although not shown in FIG. 6A, a message indicating that the mobile device 505 is waiting for participation of the other terminal may be output to the user. When the user clicks the second button 630 on the mobile device 510, the mobile device 510 may send to the mobile device 505 a command which indicates participation in generation of a 3D image. Mobile device 505 waits for participation of another electronic device to start to generate the 3D image. Although not shown, when the user clicks a button on another terminal as well as the mobile device 505 so that the other terminal waits for participation of a terminal, the user may select, via a user interface, a terminal which will cooperate to generate the 3D image.

Referring to FIG. 6B, when a determination is made that the mobile devices 505 and 510 are to participate in generation of the 3D image are determined, the displays 605 and 610 output a message indicating that they are being initialized while exchanging the setting data 515 with each other. Immediately after exchanging the setting data 515 with each other, the first and second terminals (210 and 220 in FIG. 2) are determined. In an exemplary embodiment, an assumption is made that the mobile device 505 has a higher camera resolution than the mobile device 510. Thus, the mobile devices 505 and 510 may respectively be determined as the first and second terminals 210 and 220. Referring to FIG. 6C, when the first and second terminals 210 and 220 are determined, the display 605 of the mobile device 505, determined to be the first terminal 210, outputs a message which indicates that the mobile device 505 is set as the first terminal 210. The display 610 of the mobile device 510, determined to be the second terminal 210 also outputs a message which indicates that the mobile device 510 is set as the second terminal 220, thereby completing a determination of the first terminal 210 and the second terminal 220.

Figure 7:
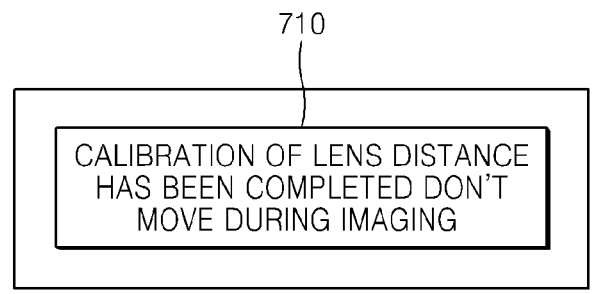
FIG. 7 illustrates a screen which indicates to a user that a distance between lenses is an optimal distance for photographing a 3D image, according to an exemplary embodiment.

FIG. 7 illustrates a screen which indicates to a user that a distance between lenses is an optimal distance for 3D imaging, according to an exemplary embodiment.

Referring to FIG. 7, the screen contains a message 710.

Referring back to FIG. 5E, immediately after obtaining the lens distance (L) 570, the mobile device 510 sends the command (550 in FIG. 5E) to the mobile device 505 indicating completion of the calibration. The command 550 may contain a message which indicates that the lens distance (L) 570 between the mobile devices 505 and 510 is an optimal distance for 3D imaging.

As shown in FIG. 7, the mobile devices 505 and 510 may inform a user by displaying the message 710 which indicates that a lens distance between the mobile devices 505 and 510 is an optimal distance for 3D imaging. The message 710 may be output to the user, thereby allowing the user to maintain the lens distance between the mobile devices 505 and 510.

Figure 8:
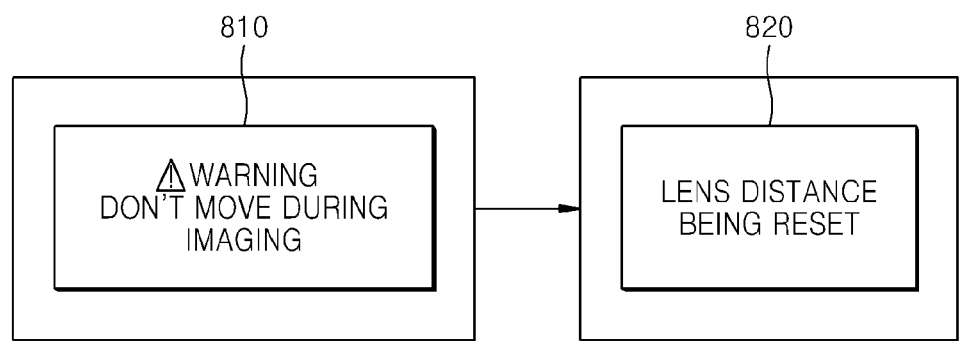
FIG. 8 illustrates a screen which indicates to a user of each terminal that a distance between lenses in first and second terminals deviates from an optimal distance for 3D imaging according to an exemplary embodiment.

FIG. 8 illustrates a screen which indicates to a user of each terminal that a lens distance between the first and second terminals (210 and 220 in FIG. 2) deviates from an optimal distance for 3D imaging according to an exemplary embodiment.

The first and second terminals 210 and 220 may acquire view images of a 3D object within a range in which the lens distance between the first and second terminals 210 and 220 does not deviate by a large amount from the optimal distance for 3D imaging in order to generate a 3D image. However, when the first or second terminal 210 or 220 moves, a warning message 810 may be output to a user to warn the user so that the lens distance between the first and second terminals 210 and 220 does not deviate from the optimal distance for 3D imaging.

In response to the first and second terminals 210 and 220 failing to maintain the optimal distance there between due to movement of the first or second terminal 210 or 220, a message 820 is output to the user, so that calibration on the lens distance is performed again in order to determine the optimal distance between the first and second terminals 210 and 220.

When an optimal distance for 3D imaging between the first and second terminals 210 and 220 is again determined, a message 710 informing the user of the optimal distance may also be output as shown in FIG. 7. As shown in FIG. 8, the message 810 may be output so that the lens distance may not deviate from the optimal distance.

Figure 9A:
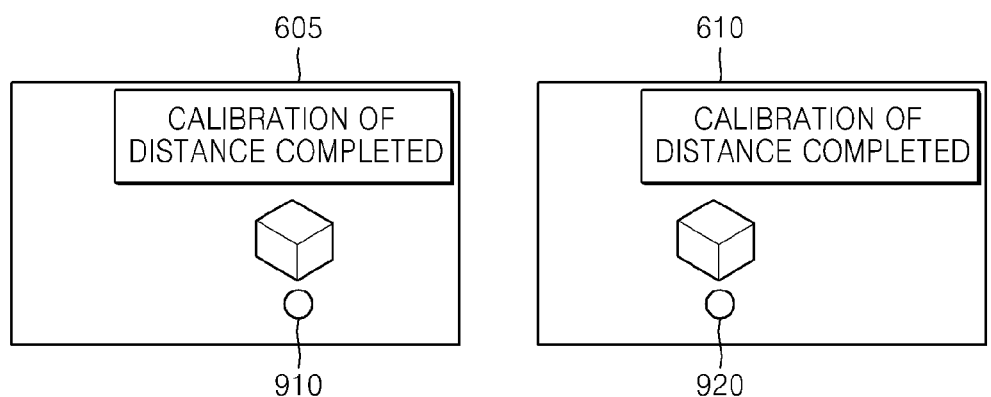
FIGS. 9A through 9C illustrate a process of generating 3D images according to an exemplary embodiment.
Figure 9B:
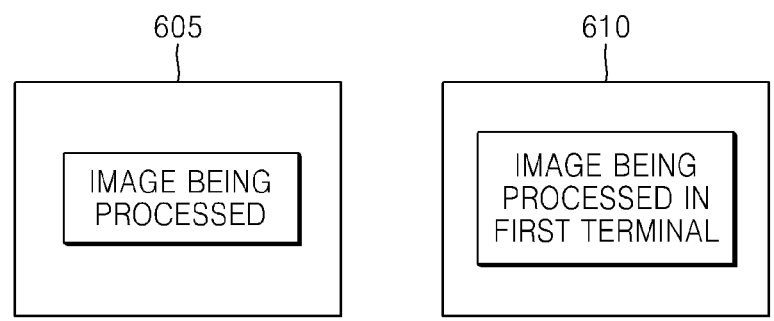
Figure 9C:
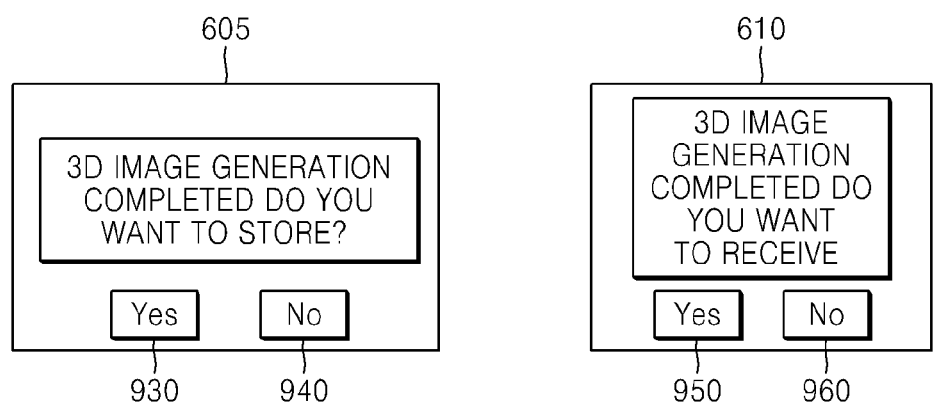

FIGS. 9A through 9C illustrate a process of generating 3D images according to an exemplary embodiment.

In an exemplary embodiment, an assumption is made that an optimal distance for 3D imaging is set between the first and second terminals (210 and 220 in FIG. 2)

Referring to FIGS. 9A through 9C, the first and second terminals 210 and 220 respectively include displays 605 and 610. As shown in FIG. 9A, a message indicating that the optimal distance has been set between the first and second terminals 210 and 220 may be output to a user. When the user selects imaging buttons 910 and 920 on the first and second terminals 210 and 220, the first and second terminals 210 and 220 may acquire view images for producing a 3D image. Upon selection of the imaging button 910 on the first terminal 210, the second terminal 220 may acquire a view image without needing to select the imaging button 920 on the second terminal 220. However, the exemplary embodiments are not limited thereto, and the display 610 of the second terminal 220 may not have the imaging button 920 thereon.

After acquiring the view images for producing a 3D image, image processing is performed in order to generate the 3D image. The first terminal 210 may perform the image processing. To do so, a view image acquired by the second terminal 220 may be sent to the first terminal 210.

Referring to FIG. 9B, while the first terminal 210 is processing the acquired view images to generate a 3D image, the display 605 of the first terminal 210 outputs a message which indicates that the images are being processed. Likewise, the display 610 of the second terminal 220 may output a message which indicates that the first terminal 210 is processing the images.

Referring to FIG. 9C, upon completing the generation of the 3D image, a message is output which indicates the completion. To store the generated 3D image, the user may click a first button 930 to store the 3D image in a storage of the first terminal 210. The user may click a second button 940 to not store the 3D image.

As shown in FIG. 9C, the display 610 of the second terminal 220 outputs a message that selects whether to receive the generated 3D image. The user may select a third button 950 to receive the 3D image generated by the first terminal 210, and a fourth button 960 to not receive the same. Although not shown, a message asking whether the user is sure to store the 3D image may be output separately to the user. In response to the user selecting to store the 3D image, the 3D image may be stored in a storage device of the second terminal 220.

Figure 10:
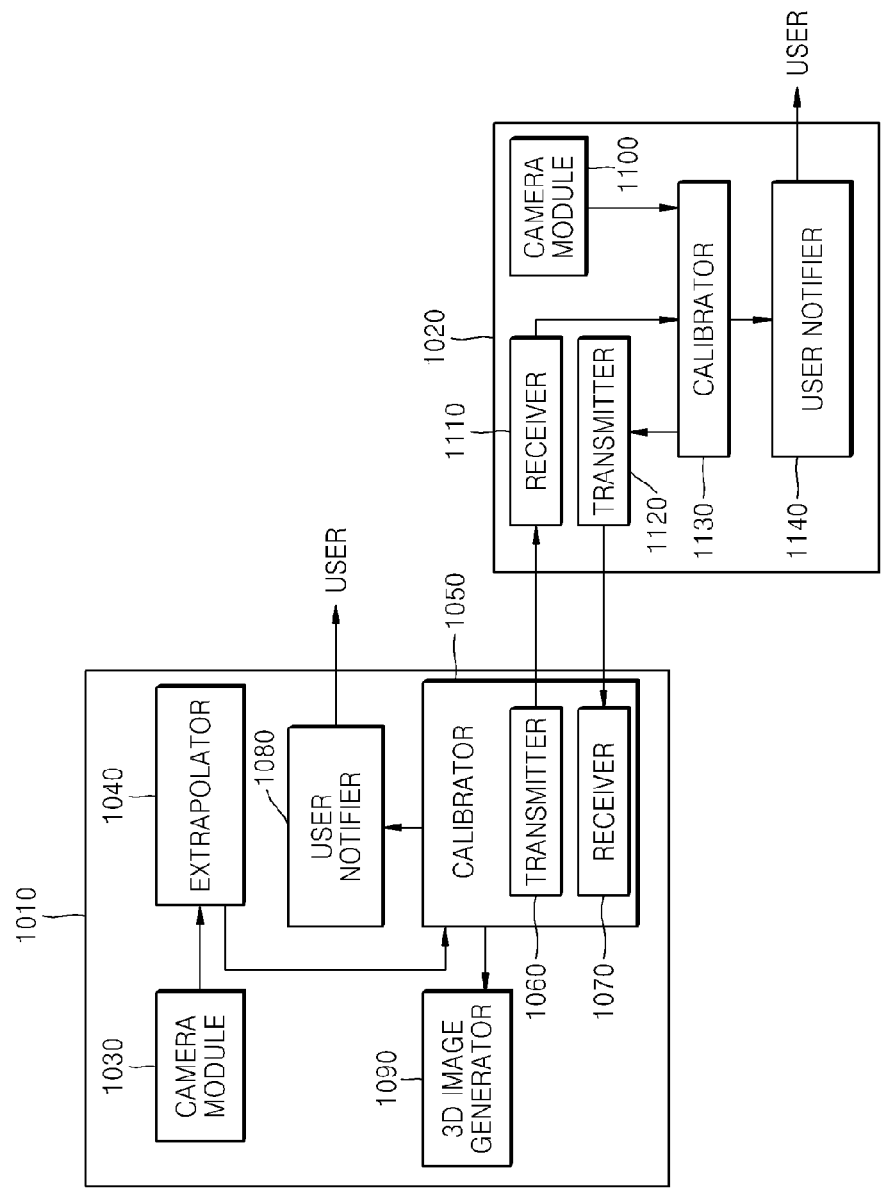
FIG. 10 illustrates a first terminal and a second terminal for generating 3D images according to an exemplary embodiment.

FIG. 10 illustrates a first terminal 1010 and a second terminal 1020 for generating 3D images according to an exemplary embodiment.

Referring to FIG. 10, the first terminal 1010 includes a camera module 1030, an extrapolator 1040, a calibrator 1050 including a transmitter 1060 and a receiver 1070, a 3D image generator 1090, and a user notifier 1080.

The second terminal 1020 includes a camera module 1100, a transmitter 1120, a receiver 1110, a calibrator 1130, and a user notifier 1140.

The camera modules 1030 and 1100 of the first terminal 1010 and the second terminal 1020 acquire view images of an object. In particular, the camera modules 1030 and 1100 may acquire view images of a 2D object in order to perform calibration on a lens distance between the first and second terminals 1010 and 1020, and view images of a 3D object in order to generate 3D images.

The extrapolator 1040 of the first terminal 1010 extrapolates from the view image acquired by the first terminal 1010 a view image of the 2D object at a location that is an interocular distance away from the first terminal 1010. The extrapolation may be performed based on at least one of a distance between the first terminal 1010 and the 2D object, a binocular parallax angle, and information related to the performance of the second terminal 1020.

The calibrator 1050 of the first terminal 1010 performs calibration of a distance between the lenses in the first and second terminals 1010 and 1020 by using the extrapolated image. The calibrator 1050 includes the transmitter 1060 to transmit the extrapolated view image to the second terminal 1020 and the receiver 1070 for receiving from the second terminal 1020 a message which indicates that the distance between lenses in the first and second terminals 1010 and 1020 is an optimal distance, based on the transmitted image.

The user notifier 1080 of the first terminal may receive the message to inform a user that the distance between lenses in the first and second terminal 1010 and 1020 is an optimal distance for 3D imaging.

The receiver 1070 of the first terminal 1010 may receive from the second terminal 1020 a view image of a 3D object from the second terminal 1020, or may receive a message which indicates that the distance between the lenses is an optimal distance for 3D imaging based on the extrapolated image.

The transmitter 1060 of the first terminal 1010 may transmit the extrapolated view image of the 2D to the second terminal 1020.

The receiver 1110 of the second terminal 1020 may receive the extrapolated view image of the 2D object from the first terminal 1010.

The calibrator 1130 of the second terminal 1020 performs calibration of a lens distance from the first terminal 1010, based on the degree of similarity between the image received by the receiver 1110 and the view image of the 2D object. For example, in response to the degree of similarity being greater than a predetermined value, the second terminal 1020 may determine that the distance between lenses in the first and second terminals 1010 and 1020 is an optimal distance for 3D imaging. On the other hand, in response to the degree of similarity being less than the predetermined value, the second terminal 1020 may determine that the lens distance is not an optimal distance for 3D imaging.

The transmitter 1120 of the second terminal 1020 may transmit to the first terminal 1010 a message which indicates that the lens distance from the first terminal 1010 is an optimal distance for 3D imaging, based on the result of the calibration performed by the calibrator 1130. The transmitter 1120 may transmit a view image of the 3D object taken when the second terminal 1020 is separated from the first terminal 1010 by the lens distance determined by the calibrator 1130.

The user notifier 1140 may inform a user that the lens distance from the first terminal 1010 is an optimal distance for 3D imaging, based on the result of the calibration.

While one or more exemplary embodiments have been described with reference to the figures, it will be understood by those of ordinary skill in the art that various changes in form and details may be made therein without departing from the spirit and scope of the present invention as defined by the following claims. Thus, it should be understood that the exemplary embodiments described therein should be considered in a descriptive sense only and not for purposes of limitation.

What is claimed is:

1. A method of generating a three-dimensional (3D) image in a first terminal in cooperation with a second terminal, the method comprising:

extrapolating from a view image of an object acquired by the first terminal a view image of the object at a location that is a predetermined distance away from the first terminal wherein the extrapolated view-image corresponds to a view image of the object to be acquired by the second terminal;

transmitting the extrapolated view image to the second terminal, wherein the second terminal is posed at the predetermined distance away from the first terminal based on the extrapolated view image;

receiving from the second terminal a message which indicates that a distance between the first terminal and the second terminal is an optimal distance for 3D imaging, based on the transmitted extrapolated view image, and notifying information related to the distance between the first terminal and the second terminal for 3D imaging based on the message; and generating a 3D image of the object by using the view image of the object acquired by the first terminal and the view image of the object acquired, when the first and second terminals are separated from each other by the distance between the first terminal and the second terminal which is based on the message, by the second terminal, wherein the acquired view image of the object acquired by the second terminal is a view image which is acquired by camera module of the second terminal, and wherein the optimal distance is related to similarity, determined by the second terminal, between the extrapolated image and a view image of the object viewed from the second terminal.

2. The method of claim 1, wherein the extrapolating of the view image of the object is performed based on at least one of a distance between the first terminal and the object, a binocular parallax angle, and information related to the performance of the second terminal.

3. The method of claim 1, wherein the predetermined distance is an interocular distance.

4. The method of claim 1, wherein the generating of the 3D image comprises the first terminal receiving from the second terminal the view image of the object acquired by the second terminal.

5. A first terminal for generating a three-dimensional (3D) image in a first terminal in cooperation with a second terminal, the first terminal comprising:
- a processor configured to extrapolate a view image of an object at a location that is a predetermined distance away from the first terminal, from a view image of the object acquired by the first terminal, wherein the extrapolated view image corresponds to a view image of the object to be acquired by the second terminal;
- a transmitter configured to transmit the extrapolated view image to the second terminal, wherein the second terminal is posed at the predetermined distance away from the first terminal based on the extrapolated view image; and
- a receiver configured to receive from the second terminal a message which indicates that a distance between the first terminal and the second terminal is an optimal distance for 3D imaging, based on the transmitted extrapolated view image,
- wherein the processor notifies information related to the distance between the first terminal and the second terminal for 3D imaging based on the message, and generates a 3D image of the object by using the view image of the object acquired by the first terminal and the view image of the object acquired, when the first and second terminals are separated from each other by the distance between the first terminal and the second terminal which is based in the message, by the second terminal,
- wherein the view image of the object acquired by the second terminal is a view image which is acquired by camera module of the second terminal, and
- wherein the optimal distance is related to similarity, determined by the second terminal, between the extrapolated image and a view image of the object viewed from the second terminal.

6. The first terminal of claim 5, wherein the processor is configured to extrapolate a view image of the object based on at least one of a distance between the first terminal and the object, a binocular parallax angle and information related to the performance of the second terminal.

7. The first terminal of claim 5, wherein the predetermined distance is the interocular distance.

8. The first terminal of claim 5, further comprising a receiver configured to receive from the second terminal the view image of the object acquired by the second terminal.

* * * * *